United States Patent Office 3,429,961
Patented Feb. 25, 1969

3,429,961
PROCESS FOR MAKING UNIFORM
ORIENTATED FILM
Arthur William Spencer, Rochester, N.Y., assignor to Eastman Kodak Company, Rochester, N.Y., a corporation of New Jersey
No Drawing. Filed Apr. 26, 1965, Ser. No. 451,003
U.S. Cl. 264—289                                     10 Claims
Int. Cl. B29c 17/02

ABSTRACT OF THE DISCLOSURE

Process for making film of uniform properties by starting with a substantially flat film with beaded edges, then establishing and maintaining a temperature differential across the width thereof, subsequently stretching the film so that the film has a geometrically uniform convex thickness profile, thereafter stretching the film in a direction perpendicular to the prior stretching so that the film having the convex thickness profile becomes rectangular except for the beaded edges and then optionally heat setting the film.

---

This invention relates to a process for making film of orientable and at least partially crystallizable thermoplastic polymers which are biaxially and non-simultaneously oriented by a novel process whereby the uniformity of the physical properties is significantly enhanced. For example, the birefringence values and variations in such values in both the widthwise and lengthwise directions are held to a minimum. Moreover, lengthwise thickness variations and edge losses are minimized. More particularly, this inveniton relates to terephthalate polyester films of improved uniformity, especially such polyesters where glycol is ethylene glycol or 1,4-cyclohexanedimethanol.

Various patents and literature references describe a great variety of procedural techniques which can be employed in the manufacture of film from orientable and crystallizable polymers. In the polyester field one of the best known references is U.S. Patent 2,823,421 granted on Feb. 18, 1958, which provides specific details as to the preparation of biaxially stretched and heat-set film composed of polyethylene terephthalate starting with a substantially amorphous sheet. Many other patents describe similar processes relating to other polymers including polystyrene, polypropylene and the like. Several of these patents disclose means for achieving improved uniformity of the physical properties employing such techniques as improved drafting equipment, improved tentering equipment, improved means for maintaining uniform temperature conditions while drafting, tentering or heat-setting including the use of the elongated heating devices having variable control features so as to apply heat in different amounts to different areas of traveling film, etc. Exemplary patents which relate to these matters include U.S. 2,851,733, British 838,708, British 930,962 and British 947,677. However, despite what has been known, film which is commercially manufactured in rather substantial quantities is generally subject to significant variations in widthwise and lengthwise directions. The properties which vary are interrelated and include density, orientation, modulus of elasticity, tensile strength, shrinkage upon heating, refractive index, thickness, etc. Further improvements in the uniformity of properties is much to be desired for commercial products since this would extend the range of utility even more into those fields where precise requirements exist, e.g. aerial photography, more particularly from extremely high altitudes, magnetic tape requirements especially where video reproduction is concerned, electrical capacitors where precise values are critical, etc.

An object of the present invention is to produce an improved film of orientable polymers having exceptionally uniform physical properties including electrical characteristics.

A further object is to minimize thickness variations in film. Another object is to minimize variations in birefringence values. Another object is to minimize variations in all physical including electrical characteristics in both the widthwise and lengthwise directions in thermoplastic orientable and crystallizable polymer film. Another object is to achieve similar objectives with respect to terephthalate polyester film, especially such film wherein the glycol is ethylene glycol or 1,4-cyclohexanedimethanol.

Additional objects will also be apparent from this specification.

According to a particular embodiment of this invention there is provided a process for making biaxially oriented film having improved uniformity of properties, said process starting with a continuously advancing substantially flat film having beaded edges, which process comprises (A) Stretching said film at an elevated temperature after establishing and maintaining a temperature differential across the width thereof, whereby both upper and lower surfaces of said film, except for the beaded edges, are convex, the convex thickness profile being geometrically similar about the longitudinal center line of the film.

(B) Stretching said film in a direction perpendicular to said prior stretching at an elevated temperature after establishing and maintaining a temperature differential across the width thereof, whereby said convex thickness profile becomes rectangular except for the beaded edges.

It is preferred that this process be followed by another process operation as follows:

(C) Heat-setting said biaxially oriented film at a temperature within the range of from about 100° C. below the melting point up to just below the melting point of said film while maintaining said film under transverse tension whereby further crystallization occurs thereby forming a biaxially oriented heat-set film.

As previously mentioned hereinabove, there are many references available in the literature as well as many patents which describe various details regarding the manufacture of biaxially oriented, heat set film prepared from many different orientable and at least partially crystallizable polymers. No purpose would be served in burdening the present specification with a detailed discussion or lengthy description of such processes since those having ordinary skill in the art will readily understand the present invention taken in context with the prior art and the disclosure of the present specification.

As mentioned above, birefringence is one of the most convenient characteristics to ascertain in determining the uniformity of the various physical characteristics of film of the type in which this invention is concerned. Birefringence is a dimensionless number and in this case is used as a direct measure of the difference of the refractive indices of the film parallel to and perpendicular to the axis of orientation in the plane of film. When a birefringent film such as oriented polyethylene terephthalate transmits a beam of plane polarized light which strikes perpendicular to the axis of orientation (normal to the plane of the sheet, for example), the line is split into two beams polarized at right angles to each other, one of which travels faster than the other. The distance that one of these beams is ahead of the other when they emerge from the film is known as the retardation of the sample (usually expressed in millimicrons) and is related to the film thicknes and to birefringence, $\Delta_n$, by the equation, $$\text{Retardation} = \text{thickness} \times \text{birefringence}$$

Thickness may be measured readily, and retardation is measured by means of a compensator such as a calibrated quartz wedge.

Another factor to be considered in regard to uniform properties is the rotation angle which should be reduced as far as possible.

In order to understand the invention more clearly and with more particular reference to a specific orientable and crystallizable polymer, reference is made to the common practice of stretching such polymer in the form of an amorphous sheet in the lengthwise direction in one operation and then stretching widthwise in another operation and finally crystallizing the sheet which is restrained from shrinking during this final operation.

Many biaxial stretching operations, including that used for polyethylene terephthalate film manufacture, can be improved by the formation and use of a rib or bead on the edge of the cast amorphous sheet. The bead is held in edge restraining devicesd uring drafting to substantially prevent "neck-in." The tentering operation also advantageously employs the same bead to help keep the edges of the sheet firmly gripped during transverse stretching and any subsequent heat-setting operation. Processes of this type can also employ localized heat controls across the width of the drafting and tentering preheat areas so as to provide local widthwise temperature control. The drafting or longitudinal stretching vernier heat controls are conventionally designed so as to maintain a uniform thickness and orientation profile across the width of the drafted sheet. The tenter or transverse stretching preheat vernier heaters are conventionally designed so that they can be adjusted to produce local temperature differences in an effort to achieve uniform thickness in the fully oriented, crystallized sheet. The edge restraining or gripping devices in both the drafter and tenter lead to local nonuniformities across the width of the final sheet. With the drafting and tentering processes conventionally operated as outlined above, the characteristics of a typical final sheet can be described as follows:

(1) A physical distortion occurs in which the edges of the sheet lead the center creating an arcuate orientation profile. The property balance, as typified by birefringence measurements, is considerably more unbalanced at the edges than at the center. A seven mil sheet may have an edge birefringence of 0.0200 to 0.0250 with a rotation angle of 28° while the sheet center may have a 0.0100 to 0.0150 birefringence value at which point there is no rotation angle. The widthwise direction of the sheet is usually characterized as having the dominant orientation direction. This nonuniformity in birefringence characteristic is also reflected in non-uniformities of tensile and other related physical properties.

(2) A typical final sheet also contains more lengthwise thickness variation in the center than on the edges. Center values of 5 to 7% are commonly found with 3 to 4% lengthwise thickness variation on the edges.

(3) The weight percent of waste sheet in the beaded edge area may be 7 to 9% of the total weight of the sheet which is a serious adverse economic factor.

The invention as described herein minimizes these deficiencies. The invention is based upon the inventor's discovery of the principle of purposely creating local differences in stretching ratios across the width of the sheet during drafting and tentering and using these differences to advantage. In a preferred form of this invention, the sheet is drafted approximately 2.9× in the sheet center, as measured by the thickness reduction ratio, and drafted about 3.3× on the edges. The subsequent tentering operation stretches the center about 3.6× while the edge tenter about 3.1×.

The local variations in draft ratio can be obtained by heating to different longitudinally localized temperatures across the width of the sheet immediately prior to draft. In the present invention the sheet center is advantageously set colder than the edges. The total force exerted on the full width of the drafting sheet is acting preferentially on the sheet center. The force acting on the edges is significantly lower. The colder sheet center section and higher stretching force of the sheet center section causes higher drafted sheet orientation in the sheet center. The hotter sheet near the edges flows toward the center, introducing a widthwise vector to the normal lengthwise stretching direction. In this case, the lengthwise vectors of stretch remain relatively close to normal draft ratio but the widthwise flow vector leads to large local differences in draft ratio as calculated by the thickness reduction ratio, calculated from the amorphous cast film thickness divided by the thickness of the longitudinally stretched (drafted) film.

The distribution across the sheet of differences in tenter ratio are obtained by varying the degree of preheat crystallization across the width of the sheet prior to transverse stretching (tentering). Thus, the thin edges of the drafted sheet are preheated to higher temperatures and become more crystallized than the thicker center section prior to and during the tentering operation.

These more crystallized edge sections resist the tentering action causing increased widthwise stretching in the sheet center and less stretching in the edge sections.

It was found that the increased crystallization of the edge sections and the reduced tenter ratios in these edge sections results in greatly increased retention of the prior lengthwise (drafted) orientation. Thus, despite the fact that the center of the drafted sheet contains the higher draft or lengthwise orientation, the preferential crystallization phenomena results in higher lengthwise orientation in the edge sections of the final sheet, while the center section is lower or unchanged. A dramatic improvement in edge property balance is realized. Edge birefringence values from 0.0130 to 0.0190 have been obtained while practicing several forms of this invention.

Further, the use of cold temperatures and locally higher drafting forces in the sheet center causes a significant improvement in center lengthwise thickness variation of the final sheet. A center variation of 5 to 7% can be reduced to 4 to 5% while the edge variation of 3 to 4% will increase to 4 to 5%. The amount of variation across the full width of the final windup sheet can therefore be made rather constant, with the characteristic peak center value reduced to a more desirable value.

Additionally, it has also been found that the increased drafting in the edge sections of the sheet with the associated sidewise flow toward the sheet center results in a reduction in the weight edge loss which would otherwise be necessitated by trimming the unacceptable portions from both edges. A typical example resulted in reduction of the weight edge loss from 8% to 6.5%. This was achieved by reason of the smaller width that must be trimmed from each edge of the final film prior to the windup of a roll of fully acceptable film having greatly improved uniformity of properties.

It will be apparent to those skilled in the art that the practice of this invention can be accomplished with a wide variety of plastic materials, operating conditions and equpment modifications. In general terms, a lengthwise stretch is accomplished in which the center of the sheet is colder than the edges causing a limited widthwise flow toward the center. Subsequent widthwise stretching employs higher edge heat in a preheating step to induce higher levels of crystallization near the edges. This novel process leads to improved lengthwise thickness control, improved property balance, and less edge loss in the final product.

One of the variations of this novel process employs cold air in the longitudinal drafter. Immediately prior to longitudinal stretching the sheet is uniformly heated by radiant heaters while the surface of the central portion is being simultaneously cooled by cold air impingement. The generally colder center area, coupled with the cross-sectional temperature characteristic of a sheet being heated throughout but cooled on the surface, creates a very desirable improvement in lengthwise thickness uniformity and property balance.

The novel process of this invention as it particularly applies to terephthalate polyesters usually involves stretching within the range of 400% to 20,000% per minute to a ratio within the range of about 2.0× to about 4.0× for both said longitudinal and transverse stretching operations. A preferred range is 2.75× to 3.75×. During such operations the temperature gradient is advantageously within the range of from about the second order transition temperature up to a temperature of about 50° C. thereabove. For polyethylene terephthalate this range is from about 70° C. up to about 120° C. For poly (1,4-cyclohexane-dimethanol terephthalate) the range is from about 80° C. to about 130° C. depending upon the ratio of cis and trans isomers of the glycol constituent, see U.S. Patent No. 2,901,466.

Those skilled in the art will be able to readily ascertain orientable and crystallizable polymers which can be made into film in accordance with the present invention. In fact, some polymers can be employed which are considered orientable but are not ordinarily through of as being crystallizable.

This invention can be further illustrated by the following examples of preferred embodiments although it will be understood that these examples are included merely for purposes of illustration and are not intended to limit the scope of the invention unless otherwise specifically indicated.

These working examples can be compared with conventional procedures well known in the art as exemplified by U.S. Patent No. 2,823,421. Thus, molten polyester can be continuously extruded through a die onto the cold surface of a rotating wheel to form an amorphous polyethylene trephthalate sheet 72 mils thick and 18½ inches wide and having beaded edges. The cast sheet can be preheated by means of a reasonably uniform application of heat and continuously stretched lengthwise (drafted) in a conventional manner whereby the drafted sheet thickness profile can be maintained essentially uniform at 24 mils. Width loss during drafting can be minimized by the use of the beaded edges formed when the sheet was cast, the beading being held by edge gripping devices so as to prevent narrowing. The sheet can be subsequently preheated and stretched widthwise (tentered) to produce 7 mil thick film which was 54 inches wide. Heat-setting can be performed and other details carried out according to well-known process conditions familiar to those skilled in the art as exemplified by said U.S. Patent No. 2,823,421.

EXAMPLE 1

According to an example of the invention described herein, the following changes in the above described conventional biaxial stretching process were performed:

|  | Conventional technique | Invention Example 1 |
| --- | --- | --- |
| Drafter preheat temp. (sheet center), ° C | 75 | 69 |
| Tenter preheat temp. (sheet center), ° C | 85 | 81 |

Draft speed-up ratio, constant at 3.3÷.
Drafting force, pounds, constant at 530.
Tenter width increase ratio, constant at 3.1×.

Independently controllable longitudinal strip heaters were arranged at intervals across the width of the sheet prior to drafting and tentering. These heaters were parallel to the direction of travel. The amount of heat applied could be varied from reasonably uniform application of heat to a generally cold-center, hot-edge operation. These heaters were approximately one foot long, and were located at one inch intervals across the width of the sheet at the front end of both the drafter and tenter preheat sections. Each individual heater was controlled by a manually operated powerstat of 600 watts capacity. In Example 1 the conventional draft operation employed wattage inputs ranging from 40 to 90 watts in the general sheet center and no heat input at the edges. While establishing the conditions to be employed for Example 1 with gradually increasing power inputs to maximum values ranging from 150 to 200 watts on the edges. In summary, the center heat input was reduced approximately 60 watts while the edge heat input was increased approximately 175 watts. These heater changes produced a smooth arcing thickness profile in the drafted sheet such that the sheet center was 27 mils thick and at a point 2″ from the edge the thickness was 19 mils. On the basis of thickness reduction ratios, the draft ratio was reduced in the center to 2.6× and increased on the edges to 3.7×. Longitudinal strip heaters immediately prior to tentering were adjusted to provide increased heat so as to achieve greater crystallization on the thin edges of the drafted sheet. The longitudinal strip heaters at the end of the tenter preheat were changed from a 120 watt center value and 210 watt edge values to approximately 20 watts in the center and 350 watts on the edges. The net effect of the arcing profile of heat input can be summarized as a 100 watt reduction in the sheet center and a 140 watt increase in edge heat input. The higher edge heat produced greater crystallization on the thin edges of the drafted sheet. The lower amount of heat provided by the center heaters permitted more widthwise stretching in the general center area. Again on the basis of thickness reduction ratio, the tenter ratio was increased to 3.9× in the center and decreased to 2.7× at a point 2″ from the sheet edge. The sheet was then heat set to give a highly uniform 7 mil sheet 54 inches wide which was wound up as a roll of film.

The drafted sheet, prior to tentering, was measured for birefringence. The $\Delta_n$ value, $N_L-N_W$, was 0.049 in the center and 0.053 on the edge of the conventionally drafted sheet. The test condition with increased edge heat produced 0.069 in the center and 0.045 on the edges. These values indicate that the test condition has less lengthwise orientation on the edges and more in the center than the conventional sheet. Despite this shift in properties the finished sheet contains more lengthwise orientation on the edges. The increased crystallization of the sheet edges in the tenter preheat coupled with the locally reduced tenter ratios in these areas permit the retention of a greatly increased portion of drafted sheet orientation on the edges. The edge birefringence of the finished sheet $\Delta_n$ is measured as $N_W-N_L$ since the widthwise refractive index value is usually longer. The increased retention of lengthwise orientation on the edges is exemplified by the reduction of edge briefringence as shown below in result No. 3.

The film manufactured by means of Example 1 of the invention was superior to that achieved by conventional techniques in the following ways:

(1) The weight percentage edge loss was reduced from about 8.0 to about 6.5% inasmuch as it was not necessary to trim off so much at the edges and still maintain a maximum acceptable thickness variation.

(2) The lengthwise thickness variation of the final windup sheet was substantially uniform across the full width of the product; the conventionally obtained high center value of 5.0% variation was reduced to 4.2% variation.

(3) The edge birefringence of the final product, measured 4″ from the edge, was improved from 0.021 to 0.019. The angle of orientation rotation was also reduced.

EXAMPLE 2

This example is based upon essentially the same conventional equipment and novel process as described in Example 1. The application of the invention was performed according to a somewhat different variation as follows:

|  | Conventional technique | Invention Example 2 |
|---|---|---|
| Draft preheat temp. (sheet center), ° C | 75 | 79 |
| Draft air temp. during stretch, ° C | 102 | 76 |
| Tenter preheat temp. (sheet center), ° C | 88 | 81 |

Draft speed-up ratio, constant at 3.3×.
Drafting force, pounds, constant at 550.
Tenter width increase ratio, constant at 3.1×.

The longitudinal heaters spaced at intervals across the sheet prior to drafting and tentering were adjusted to deviate from reasonably uniform settings so as to produce a generally cold-center, hot-edge operation. The drafter strip heater inputs were reduced 10 to 20 watts in the center section and increased 10 to 40 watts. The tenter preheat strip heaters were decreased approximately 60 watts in the center and increased 100 watts on the edges. In addition to the differential heat treatment, this example of the invention employed 76° C. air impinged at high velocity on the general sheet center immediately prior to draft, rather than the conventional hot air impinged on the full width of the sheet. The use of the colder drafting air in the center and the particular strip heater settings employed in this example produced a 2.9× draft ratio (by measuring thickness reduction) in the center and 3.3× draft 2″ from the edge. The tentering operation was then conducted so that extra heat was applied near the edges and produced 3.6× tentering in the center and 3.1× at a point 2″ from the edge of the sheet.

It can be noted in this example that the use of center-applied, cold drafting air replaces or complements the drafter strip heater changes. The drafter strip heater changes of Example 2 are therefore less pronounced than Example 1 changes.

The product manufactured by means of Example 2 of the invention was a highly uniform 7 mil sheet 54 inches wide.

The film or sheeting manufactured according to the invention as described in Example 2 above was superior to the product manufactured by conventional means in the following ways:

(1) Edge loss was reduced as explained in Example 1.

(2) The lengthwise thickness variation of the product sheet was made uniform across the full width of the sheet; the conventionally obtained high center value of 2.4% variation was reduced to 1.9% variation.

(3) The edge birefringence of the final film product, measured 4″ from the edge was improved from 0.019 to 0.014. Similarly, the angle of orientation rotation was reduced from 28° to 23°.

The preceding examples are based upon process operations wherein the film is polyethylene terephthalate. Film or sheeting can be similarly manufactured in accordance with this invention from polyesters of terephthalic acid where up to 30 mole percent of the terephthalic acid is replaced by one or more other dicarboxylic acids such as azelaic acid, naphthalene dicarboxylic acid, isophthalic acid, adipic acid, etc. Moreover, ethylene glycol can be replaced in part or entirely by one or more other glycols including those mentioned hereinabove as well as other glycols such as tetramethylene glycol, diethylene glycol, polyethylene glycol, poly (tetramethyene glycol), etc. Other specific constituents are mentioned in the prior art concerning terephthalate polyesters wherein the polymers are derived from at least one glycol condensed with terephthalic acid or a mixture comprising terephthalic acid wherein the terephthalic acid usually comprises at least 70 mole percent of the overall acid constituent. Of course, the only significant requirement is that the polymer be such that an amorphous film thereof can be oriented and crystallized. Hence, many other polyesters are included within the broad scope of the invention in addition to the terephthalate polyesters. Moreover, the invention also encompasses many other polymers in addition to esters including polyolefins, polyamides, polyurethanes, polymers of mono-olefinically unsaturated organic compounds such as styrene, methacrylic acid and its esters, etc.

Although the invention has been described in considerable detail with reference to certain preferred embodiments thereof, it will be understood that variations and modifications can be effected without departing from the spirit and scope of the invention as described hereinabove.

I claim:
1. A continuous process for making biaxially oriented film having physical characteristics of improved uniformity, said process starting with a continuously advancing substantially flat film having beaded edges essentially composed of a substantially amorphous orientable and crystallizable thermoplastic polymer, which process comprises at least three operations as follows:

(1) longitudinally stretching said amorphous flat film having said beaded edges held in contact with means for maintaining a substantially constant width, said film being stretched to from about 2.0× to about 4.5× at above the second order transition temperature while maintaining a temperature gradient across its width characterized by a relatively cold center section and relatively hot edge sections, thereby forming an elongated film in which a greater thickness at about the center smoothly tapers to smallest thickness values in proximity to the beaded edges whereby the profile of said film has smoothly arcing convex surfaces, said greatest thickness being at least 10% greater than said smallest thickness, then, (2) conducting said elongated film from said longitudinal stretching operation to a transverse stretching operation, just prior to which the temperature of said film is adjusted to have a temperature gradient across its width characterized by a relatively cold center section and relatively hot edge sections so as to produce greater crystallization in proximity to the beaded edges as compared to the center section, (3) transversely stretching said elongated film while holding said beaded edges in contact with means for increasing the width, said film being stretched to from about 2.0× to about 4.5× at above the second order transition temperature while maintaining a temperature gradient across its width characterized by a relatively cold center section and relatively hot edge sections thereby forming a biaxially oriented film.

2. A process as defined by claim 1 which is followed by a fourth operation as follows:

(4) heat-setting said biaxially oriented film at a temperature within the range of from about 100° C. below the melting point up to just below the melting point of said film while maintaining said film under transverse tension whereby further crystallization occurs thereby forming a biaxially oriented heat-set film.

3. A process as defined by claim 1 wherein the polymer is a terephthalate polyester and said stretching is within the range of 400% to 20,000% per minute and said stretch ratios are within the range of 2.75× to 3.75× for both said longitudinal and transverse stretching operations.

4. A process as defined by claim 2 wherein the polymer is a terephthalate polyester and the temperature of said film during stretching is within the range of from about the second order transition temperature up to a temperature about 50° C. thereabove.

5. A process as defined by claim 4 which is followed by cutting off said beaded edges whereby less than 8% by weight of said film is removed as edge loss, the remainder of said film having lengthwise thickness variations in the center section and birefringence variations in the edge sections which are no greater than about 90% of the values for such variations where none of said temperature gradients have been established.

6. A process as defined by claim 1 wherein said polymer is polyethylene terephthalate.

7. A process as defined by claim 2 wherein said polymer is polyethylene terephthalate.

8. A process as defined by claim 3 wherein said polyester is polyethylene terephthalate.

9. A process as defined by claim 4 wherein said polyester is polyethylene terephthalate.

10. A process as defined by claim 5 wherein said polyester is polyethylene terephthalate.

References Cited

UNITED STATES PATENTS

| | | | |
|---|---|---|---|
| 3,161,711 | 12/1964 | Tassler | 264—289 |
| 3,248,551 | 11/1966 | Yumoto et al. | 264—289 |
| 2,412,187 | 12/1946 | Wiley et al. | 264—289 |
| 2,823,421 | 2/1958 | Scarlett | 264—289 |

JULIUS FROME, *Primary Examiner.*

H. MINTZ, *Assistant Examiner.*